US007191514B2

(12) United States Patent
Kawaguchi et al.

(10) Patent No.: US 7,191,514 B2
(45) Date of Patent: Mar. 20, 2007

(54) STRETCH LABEL ATTACHING DEVICE

(75) Inventors: Makoto Kawaguchi, Numazu (JP); Hideo Ichikawa, Numazu (JP); Kotaro Koide, Numazu (JP); Masashi Hasegawa, Numazu (JP); Toshihide Tomotaka, Numazu (JP); Tomokazu Saitoh, Fuji (JP); Masaki Serizawa, Numazu (JP); Atsushi Inoue, Numazu (JP); Seiji Terazawa, Shizuoka-ken (JP)

(73) Assignee: Ricoh Company Limited, Tokyo (JP)

( * ) Notice: Subject to any disclaimer, the term of this patent is extended or adjusted under 35 U.S.C. 154(b) by 412 days.

(21) Appl. No.: 10/634,784

(22) Filed: Aug. 6, 2003

(65) Prior Publication Data

US 2004/0094259 A1 May 20, 2004

(30) Foreign Application Priority Data

Aug. 9, 2002 (JP) ............................ 2002-234195

(51) Int. Cl.
*B23P 21/00* (2006.01)

(52) U.S. Cl. ............................ 29/775; 29/235; 29/450

(58) Field of Classification Search .................. 29/775, 29/773, 235, 450

See application file for complete search history.

(56) References Cited

U.S. PATENT DOCUMENTS

| | | | | | |
|---|---|---|---|---|---|
| 929,154 | A | * | 7/1909 | Morton et al. | 69/1 |
| 1,319,297 | A | * | 10/1919 | Limacher | 215/11.1 |
| 1,408,039 | A | * | 2/1922 | Snyder | 29/235 |
| 1,488,901 | A | * | 4/1924 | Armstrong | 29/235 |
| 1,629,207 | A | * | 5/1927 | Drummond | 29/235 |
| 2,038,840 | A | * | 4/1936 | Hall | 29/235 |
| 2,158,527 | A | * | 5/1939 | Rose | 29/235.5 |
| 2,830,361 | A | * | 4/1958 | Bruner | 29/235 |
| 3,238,609 | A | * | 3/1966 | Nichols | 29/235 |
| 3,850,777 | A | * | 11/1974 | Mare et al. | 156/494 |
| 4,068,364 | A | * | 1/1978 | Tharp et al. | 29/235 |
| 4,188,249 | A | | 2/1980 | Fujio | |
| 4,446,616 | A | | 5/1984 | Waterman | |
| 4,736,506 | A | * | 4/1988 | Hanebrink | 29/235 |
| 6,049,960 | A | * | 4/2000 | Pilling et al. | 29/450 |

FOREIGN PATENT DOCUMENTS

| | | |
|---|---|---|
| FR | 2 808 504 | 11/2001 |
| JP | 7-66235 | 7/1995 |

* cited by examiner

*Primary Examiner*—David P. Bryant
*Assistant Examiner*—Christopher M. Koehler
(74) *Attorney, Agent, or Firm*—Oblon, Spivak, McClelland, Maier & Neustadt, P.C.

(57) ABSTRACT

A stretch label attaching device for attaching a stretch label on a good, including an adapter supporting the label from the inside thereof and has an opening into which the good is inserted; an adapter support member configured to support a lower portion of the adapter and has an opening into which the good is inserted; and an adapter fixing member configured to fix the lower portion of the adapter together with the adapter support member. A method for attaching a stretch label on a good including setting a stretch label on the adapter mentioned above; inserting the good into the openings of the adapter and adapter support member while extending the label at a ratio not greater than 5 %; and releasing the stretch label attaching device from the good while holding the label, to attach the label to the predetermined position of the good.

19 Claims, 7 Drawing Sheets

STRETCH LABEL ATTACHING DEVICE

CROSS REFERENCE TO RELATED APPLICATION

This document claims priority and contains subject matter related to Japanese Patent Application No. 2002-234195 filed on Aug. 9, 2002, incorporated herein by reference.

BACKGROUND OF THE INVENTION

1. Field of the Invention

The present invention relates to a device for attaching a stretch label on a surface of a good such as containers containing toners, chemicals, cosmetics, foods or the like. In addition, the present invention also relates to a method for attaching a stretch label.

2. Discussion of the Background

Conventionally, a heat shrinkable label is attached to a container containing a good such as toners. Attaching such a label on a container makes it possible to easily identify the content (for example, a cyan toner, a magenta toner, a yellow toner or a black toner) of the container from outside.

In this case, since a toner is contained in the container after the label is attached to the container upon application of heat thereto, the toner is not affected by the heat.

However, recently there is a need such that a label is attached to an outer surface of a container in which a toner is already contained. In this case, it is not preferable to adhere a label to a container upon application of heat because the properties of the toner in the container tend to be changed. In addition, in this method the label attaching apparatus needs to have a heating device, and thereby the apparatus becomes large in size. Further, a large amount of carbon dioxide is generated when rising the temperature of the heating device, resulting in warming of the earth. Therefore, recently stretch labels which can be attached to a good such as toner containers and other containers utilizing only the elasticity of the labels (i.e., without applying heat thereto) have been used.

For example, published examined Japanese Patent Application No. 7-66235 (i.e., unexamined Japanese Patent Application No. 05-42922) discloses a method for attaching a stretch label on a PET (polyethylene terephthalate) bottle containing a liquid such as carbonated drinks. This method uses a tube-like stretch label having a slip preventing member on an inner surface thereof. At first, an extending/contracting device is inserted into the stretch label to extend the stretch label at the slip preventing member. Then the stretched label is set on the predetermined position of the container by the extending/contracting device, followed by removal of the device from the container, resulting in attachment of the stretch label to the container.

However, the method has the following drawbacks. At first, the extending/contracting device is not simple. In addition, since the portions of the stretch label on which the slip preventing member is provided are forcibly extended (stretched) by about 10% by the extending/contracting device, the extendability and contractibility (i.e., stretchability) of the label are deteriorated, resulting in defective attachment of the label.

Because of these reasons, a need exists for a stretch label attaching device by which a stretch label can be easily attached to a predetermined portion of a container with precision.

SUMMARY OF THE INVENTION

Accordingly, an object of the present invention is to provide a stretch label attaching device by which a stretch label can be easily attached to a predetermined portion of a good (such as containers) with precision.

Another object of the present invention is to provide a method for attaching a stretch label by which a stretch label can be easily attached to a predetermined portion of a container with precision.

Briefly these objects and other objects of the present invention as hereinafter will become more readily apparent can be attained by a stretch label attaching device for attaching a stretch label on a good, including:

(1) an adapter (hereinafter referred to as a member (A)) configured to support the stretch label from an inside of the stretch label and having an opening into which the good is inserted when attaching the stretch label on the good;

(2) an adapter support member (hereinafter referred to as a member (C)) configured to support a lower portion of the adapter and having an opening into which the good is inserted when attaching the stretch label on the good; and (3) an adapter fixing member (hereinafter referred to as a member (B)) configured to fix the lower portion of the adapter together with the adapter support member.

It is preferable that the member (B) is engaged with the member (C) with the member (A) therebetween.

The members (B) and (C) fixedly support the member (A) while contacting at least one point of the member (A).

It is preferable that a surface of the member (C) contacting the member (A) has a projected portion and a recessed portion.

The length of the portion of the member (A) extending from the member (B) is shorter than the length of the stretch label.

The width of the portion of the member (A) extending from the member (B) decreases in the direction apart from the member (B) (i.e., the portion of the member (A) is tapered). Alternatively, at least the top portion of the member (A) is tapered.

The member (A) preferably has a notch extending from the top of the member (A) toward the bottom thereof.

It is preferable that the notch is formed such that an extension of the notch is substantially perpendicular to a tangent line at a point P of the bottom of the member (A). By forming the notch 21 in such a manner, damaging of the member (A) caused when stretch labels are set on the member (A) can be controlled (i.e., the life of the member (A) can be extended)

The edge of the notch is preferably curled inwardly (i.e., toward the inside of the member (A)).

The notch preferably extends so as to meet (reach) the member (B) when the members (A), (B) and (C) are fixedly set.

The member (A) preferably has at least one of an extending/contracting property and an elasticity.

It is preferable that the member (A) is made of a polyethylene terephthalate and has a thickness of from 10 to 200 μm.

It is also preferable that both the members (A) and (B) have an elasticity, and the elasticity of the member (B) is larger than that of the member (A).

It is preferable that when the good is inserted into the stretch level attaching device through the openings of the members (A) and (C) to an extent such that the bottom of the good is level with the bottom of the member (C), the stretch label occupies a predetermined attaching position (i.e., the top of the stretch label is level with the top of the predetermined attaching position of the stretch label).

It is preferable that the outer surface of the member (A) has a slipping property higher than that of the inner surface of the stretch label, and the inner surface of the member (C) has a slipping property higher than that of the outer surface of the good on which the stretch label is to be attached.

The inner surface of the member (C) is preferably a rugged surface (i.e., a surface having a projected portion and a recessed portion), namely the member preferably has a good slidability.

It is preferable that the stretch label attaching device further has a counter configured to count the label attached.

As another aspect of the present invention, a method for attaching a stretch label on a good such as containers is provided which includes:

setting a stretch label on the member (A) of the stretch label attaching device mentioned above;

inserting a good into the stretch label attaching device through the openings of the members (A) and (C) while stretching the stretch label at a stretching ratio not greater than 5% so that the stretch label occupies a predetermined attaching position of the good;

releasing the stretch label attaching device from the good while holding the label, to attach the stretch label to the predetermined attaching position of the good.

It is preferable that the method further includes:

applying a lubricant on the outer surface of the member (A) before the stretch label is set on the member (A); and/or applying a lubricant on the inner surface of the member (C) before the stretch label is set on the member (A).

The stretch label may have a notch to be easily attached to the good.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention will be explained in detail referring to drawings.

Figure 1:
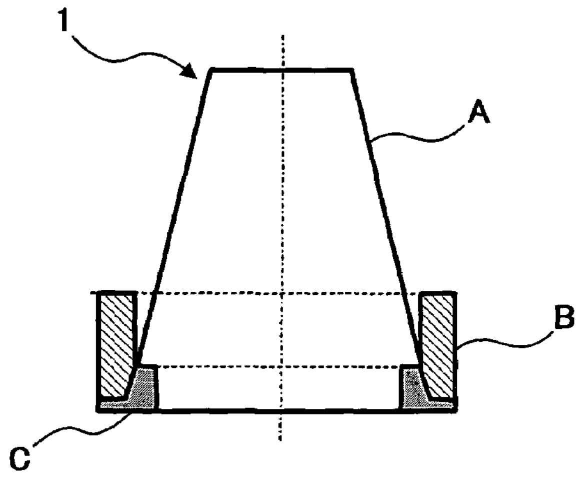
FIG. 1 is a cross sectional view of the stretch label attaching device of the present invention.
Figure 2A:
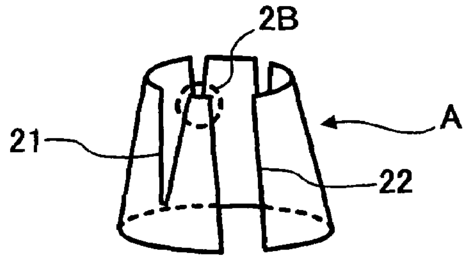
FIG. 2A is a perspective view of the member (A) constituting the stretch label attaching device of the present invention.
Figure 3:
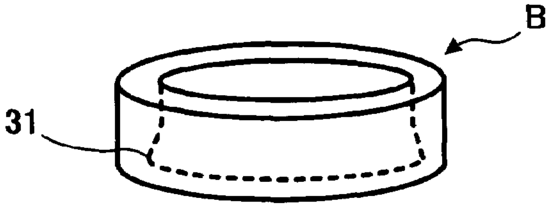
FIG. 3 is a perspective view of the member (B) constituting the stretch label attaching device of the present invention.

As illustrated in FIG. 1, a device 1 for attaching a stretch label (hereinafter referred to as a stretch label attaching device 1) of the present invention includes an adapter (i.e., a member (A)) configured to support a stretch label from the inside of the stretch label and which is illustrated in FIG. 2A; an adapter fixing member (i.e., a member (B)) configured to fix the member (A) and which is illustrated in FIG. 3; and an adapter support member (i.e., a member (C)) configured to support the member (A) and which is illustrated in FIG. 4.

The member (A) has a cylindrical form (or a frustum form) and includes plural notches 21, which extend from the top of the member (A) toward the bottom thereof. In addition, the member (A) preferably includes a cut portion 22 which extends from the top to the bottom of the member (A) (i.e., the member (A) is cut at the portion 22).

The member (B) has a form like a donut and the inside diameter of the member (B) increases from the middle toward the bottom thereof. Namely, the member (B) has a slanted portion 31 as illustrated in FIG. 3.

Figure 4A:
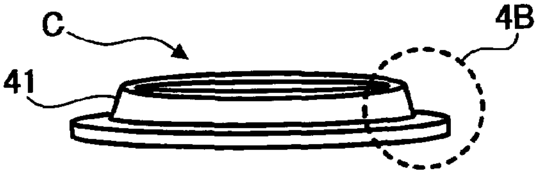
FIG. 4A is a perspective view of the member (C) constituting the stretch label attaching device of the present invention.
Figure 4B:
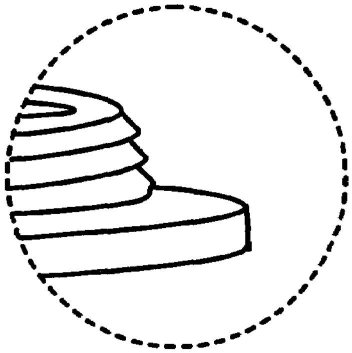
FIG. 4B is a perspective view illustrating the projected portion and recessed portion of the outer surface of the member (C)
Figure 5:
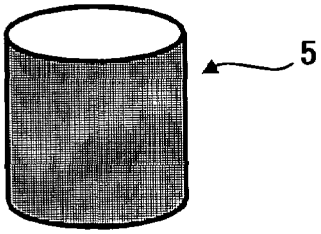
FIG. 5 is a perspective view of a stretch label which is to be attached by the stretch label attaching device of the present invention.
Figure 6:
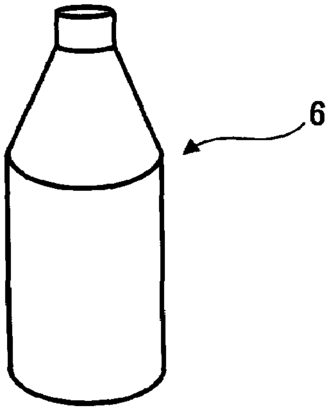
FIG. 6 is a perspective view of a good (container) to which a stretch label is attached by the stretch label attaching device of the present invention.

The member (C) has a frustum form and the diameter of the outer surface of the member (C) increases from the top toward the middle thereof. Namely, the member (C) has a slanted portion 41 as illustrated in FIG. 4A. In addition, the slanted portion 41 has a projected portion and a recessed portion as illustrated in FIG. 4B to prevent the member (A) from releasing from the members (B) and (C).

Referring to FIG. 1, the slanted portions 31 and 41 have substantially the same angle of inclination so that the member (A) can be fixed by being sandwiched by the slanted portions 31 and 41. Namely, the member (A) is fixed by the member (B) and the member (C) which are engaged with each other. The member (A) is supported by the members (B) and (C) while contacting one or more portions of the members (B) and (C).

In the stretch label attaching device of the present invention, the member (A) moves while the inner surface thereof contacts a good such as containers and the outer surface thereof supports a stretch label by contacting the inner surface of the stretch label. Therefore, the member (A) tends to be relatively easily damaged compared to the members (B) and (C). However, in the stretch label attaching device of the present invention, the member (A) can be easily replaced with new one because the members (A), (B) and (C) can be easily separated from the others.

The surface of the slanted portion 41 of the member (C) preferably has a projected portion and a recessed portion. As illustrated in FIG. 4B, the slanted portion 41 preferably has a ridge and a groove. When the slanted portion 41 has such a roughened surface, the member (A) can be supported by the member (B) and the member (C) while strongly pressed to the member (C) by the member (B). Therefore, occurrence of a problem in that the stretch label attaching device is separated into the members (A), (B) and (C) in use can be prevented.

By using such a stretch label attaching device, the stretching ratio of the stretch label to be attached can be controlled so as to be not greater than 5%, and thereby occurrence of a problem in that the stretch label loses its extending/contracting ability (stretchability) can be prevented. In addition, the operating efficiency of the operations using the stretch label attaching device is 5 or more times the operating efficiency of conventional manual operations. Further, stretch labels can be attached to a good with high positional precision.

When the length of the portion of the member (A) extending from the member (B) is shorter than the height of the stretch label to be attached, the stretch label can be easily set on and released from the member (A). It is preferable that at least the top portion of the member (A) is continuously tapered. It is more preferable that the member (A) is tapered such that the diameter is continuously increases from the upper portion thereof toward the bottom portion. When the member (A) has such constitution, the member (A) can be easily inserted into the stretch label to be attached.

The member (A) preferably has a notch 21 on a portion thereof such that the member (A) can be easily inserted into the stretch label to be attached. The number of the notch 21 formed on the member (A) is determined depending on the conditions of the stretch label to be attached, and is generally from 2 to 6.

Figure 2B:
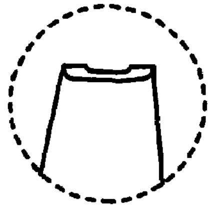
FIG. 2B is a perspective view illustrating a notch formed on the member (A)
Figure 2C:
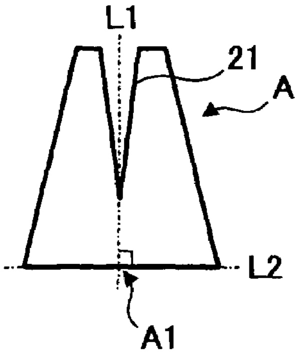
FIG. 2C is a schematic view of the member (A) for explaining the positional relationship between the notch and the member (A)

As illustrated in FIG. 2C, it is preferable that the notch 21 is formed such that an extension L1 of the notch 21 is substantially perpendicular to a tangent line L2 at a point A1 of the bottom of the member (A). By forming the notch 21 in such a manner, damaging of the member (A) caused when stretch labels are set on the member (A) can be controlled (i.e., the life of the member (A) can be extended).

In addition, as illustrated in FIG. 2B, the edge of the notch 21 is preferably curled inwardly to control damaging of the member (A) caused when stretch labels are set on the member (A) and to prevent the stretch label from breaking.

Further, the notch 21 preferably reaches the member (B) (i.e., the end portion of the notch 21 faces the member (B)) when the member (A) is fixed by the members (B) and (C). By forming such a notch, damaging of the member (A) caused when stretch labels are set on the member (A) can be controlled.

The member (A) preferably has an extending/contracting property to control damaging of the member (A) caused when labels are set on the member (A).

It is preferable that the member (A) is made of a polyethylene terephthalate and has a thickness of from 10 to 200 μm so as not to be damaged when stretch labels are set on the member (A).

In the stretch label attaching device of the present invention, the member B preferably has an elasticity larger than that of the member (A) to control damaging of the member (A) caused when stretch labels are set on the member (A).

Figure 10:
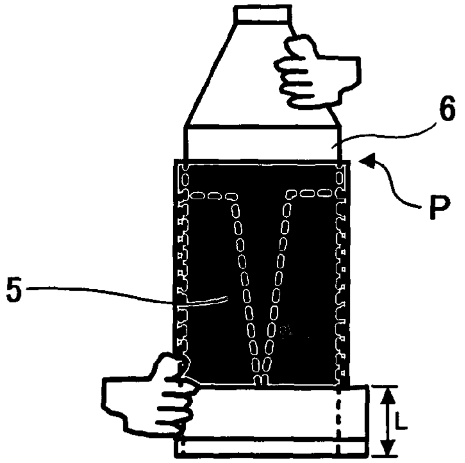

It is preferable that when a good on which a stretch label is to be attached is inserted into the members (C) and (A) so that the bottom of the good is level with the bottom of the member (C) (i.e., the bottom of the stretch label attaching device), the stretch label occupies a predetermined attaching position (i.e., the top of the stretch label is level with the top of the predetermined attaching position of the label). Namely, as illustrated in FIG. 10, the height L of the combination of the members (B) and (C) is preferably adjusted such that when a good on which a stretch label is to be attached is inserted to the stretch label attaching device so that the bottom of the good is level with the bottom of the member (C), the top of the stretch label has a position level with a top P of the predetermined attaching position of the stretch label.

The outer surface of the member (A) preferably has a slipping property higher than that of the inner surface of the stretch label to easily attach a stretch label to a good. The slipping property can be enhanced by, for example, applying a silicone or the like material to the outer surface of the member (A).

In addition, the inner surface of the member (C) has a slipping property higher than that of the outer surface of the container to which a stretch label is to be attached, to easily attach a stretch label to a good. The slipping property can be enhanced by, for example, applying a silicone or the like material thereto.

The inner surface of the member (C) is preferably rugged (i.e., the inner surface has a projected portion and a recessed portion) to easily attach a stretch label to a good.

Further, the member (C) preferably has a good slidability to easily attach a stretch label to a good because the member (C) can be slid onto the good. In order to impart good slidability to the member (C), the member (C) preferably includes a material such as polyacetals, nylons and polyethylenes.

The members (A), (B) and (C) constituting the stretch label attaching device of the present invention are typically made of a material such as plastics and metals. In particular, the member (A) is preferably made of a plastic.

Figure 13:
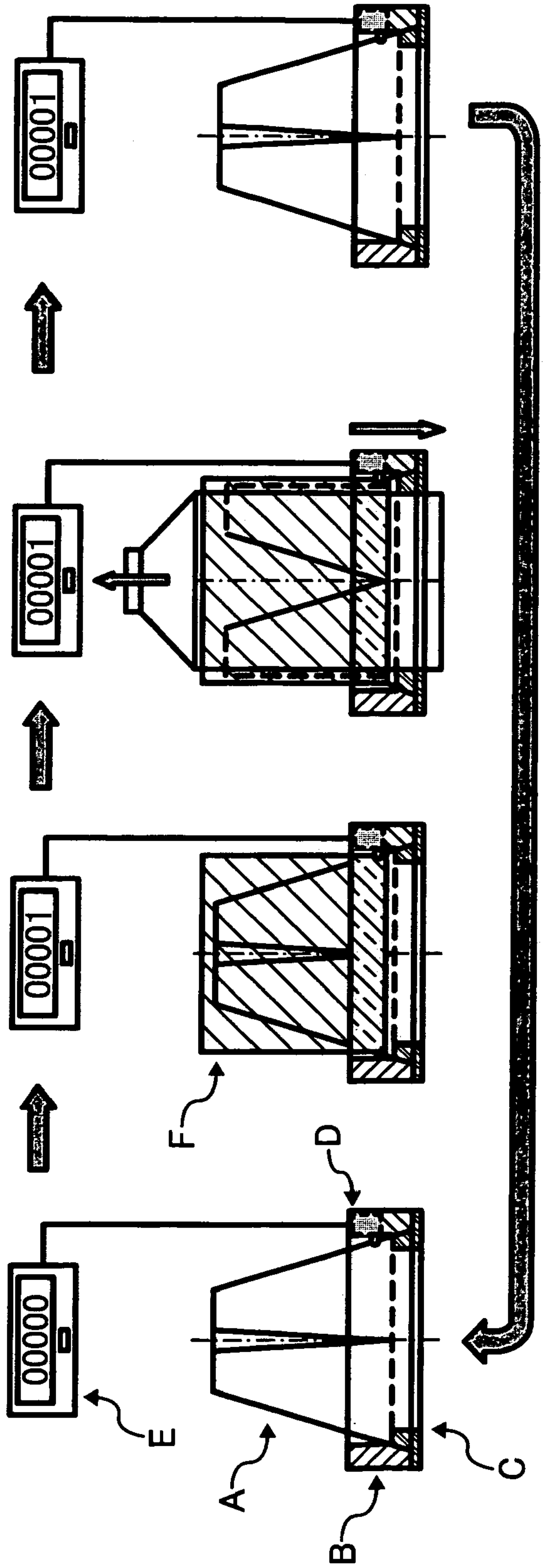
FIG. 13 is a schematic showing a counter provided with a stretch label attaching device.

As shown in FIG. 13, a counter (D) is preferably provided on the stretch label attaching device to automatically count the number of the labels attached to goods (containers). By setting a counter on the stretch label attaching device, the stretch label attaching operation can be efficiently performed because the operator can concentrate on the operation without counting the number of the labels. Specifically, the number of the labels attached to goods can be counted by, for example, setting a sensor such as microswitches (E) at a position between the member (A) and the member (B). When a label is set a predetermined position, the label is mechanically, physically (optically) or electrically detected and thereby the number of labels attached can be counted.

Then the method for attaching a stretch label to a good (a bottle, in this case) will be explained referring to FIGS. 7 to 12.

Figure 7:
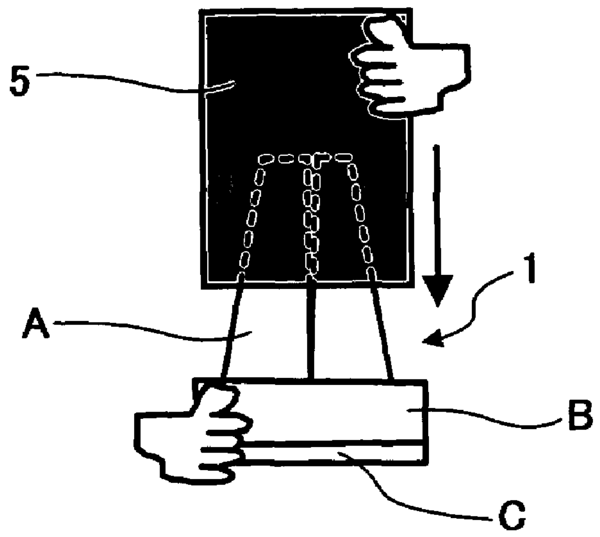
FIGS. 7 to 11 are schematic views for explaining the method of the present invention for attaching a stretch label to a good (container)
Figure 8:
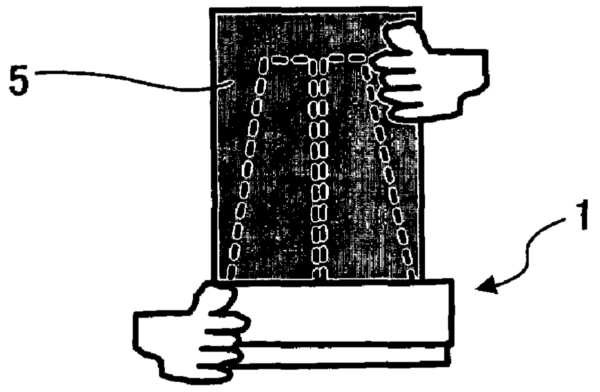
Figure 9:
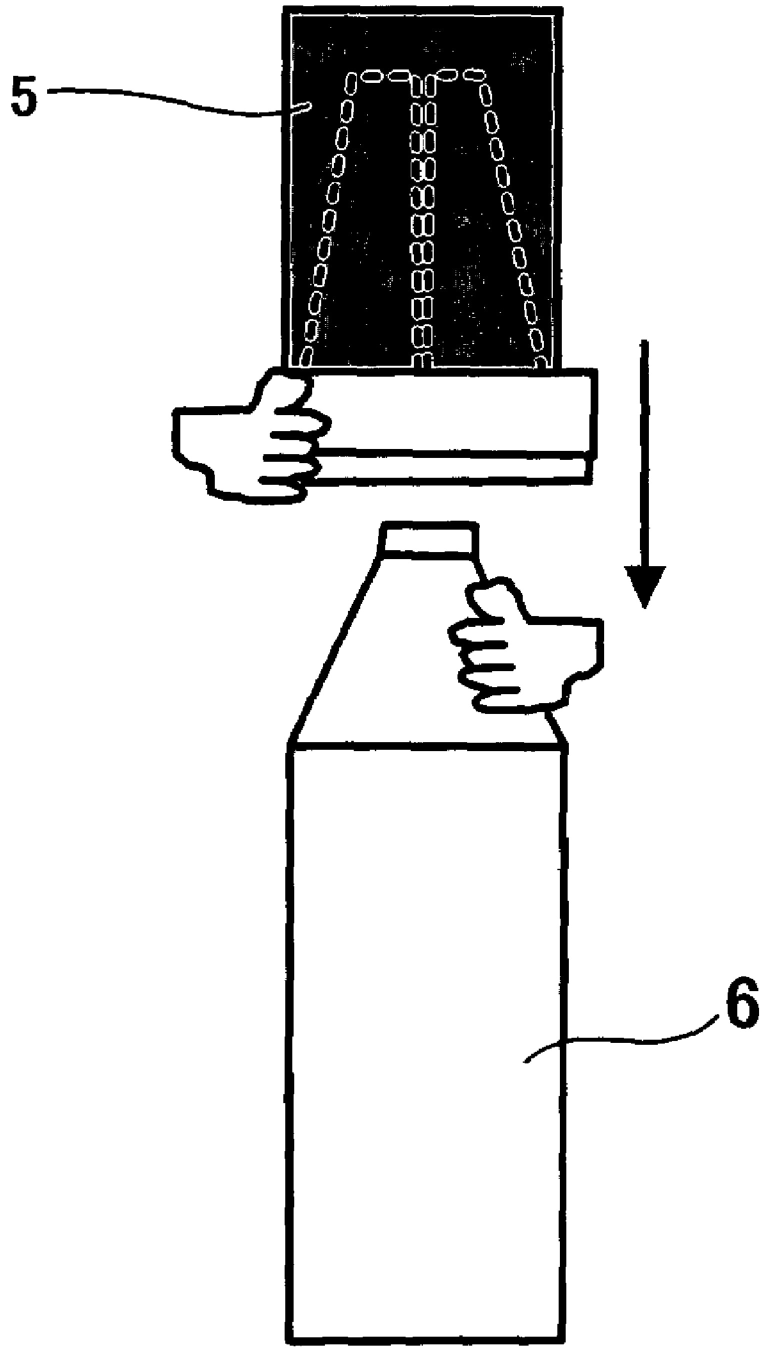
Figure 11:
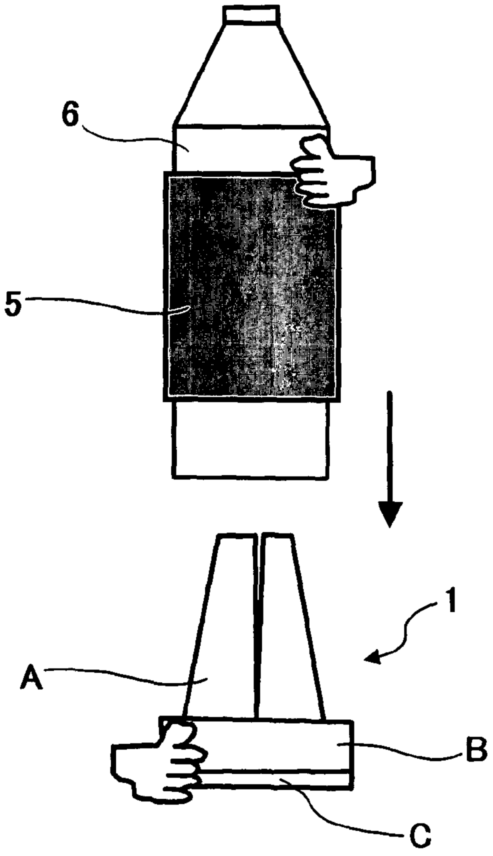

(1) at first, the stretch label attaching device 1 (i.e., the combination of the members (A), (B) and (C)) is supported by a hand, and a stretch label 5 is set on the member (A) by another hand such that the label covers the member (A) as illustrated in FIG. 7;

(2) then the stretch label 5 is inserted to the stretch label attaching device 1 such that the lower end of the stretch label 5 contacts the member B while the device 1 is supported by a hand as illustrated in FIG. 8;

(3) a bottle 6 is inserted into the stretch label attaching device 1 having the stretch label 5 thereon while the stretch label 5 is support by a hand so as not move, as illustrated in FIG. 9;

(4) the stretch label attaching device 1 is lowered by a hand while the top of the bottle is supported by another hand as illustrated in FIG. 10;

(5) when the stretch label 5 arrives at a predetermined position of the bottle, the stretch label 5 is held by, for example, fingers; and (6) then the stretch label attaching device 1 is detached from the bottle 6 while the stretch label 5 is held by fingers as illustrated in FIG. 11.

Figure 12:
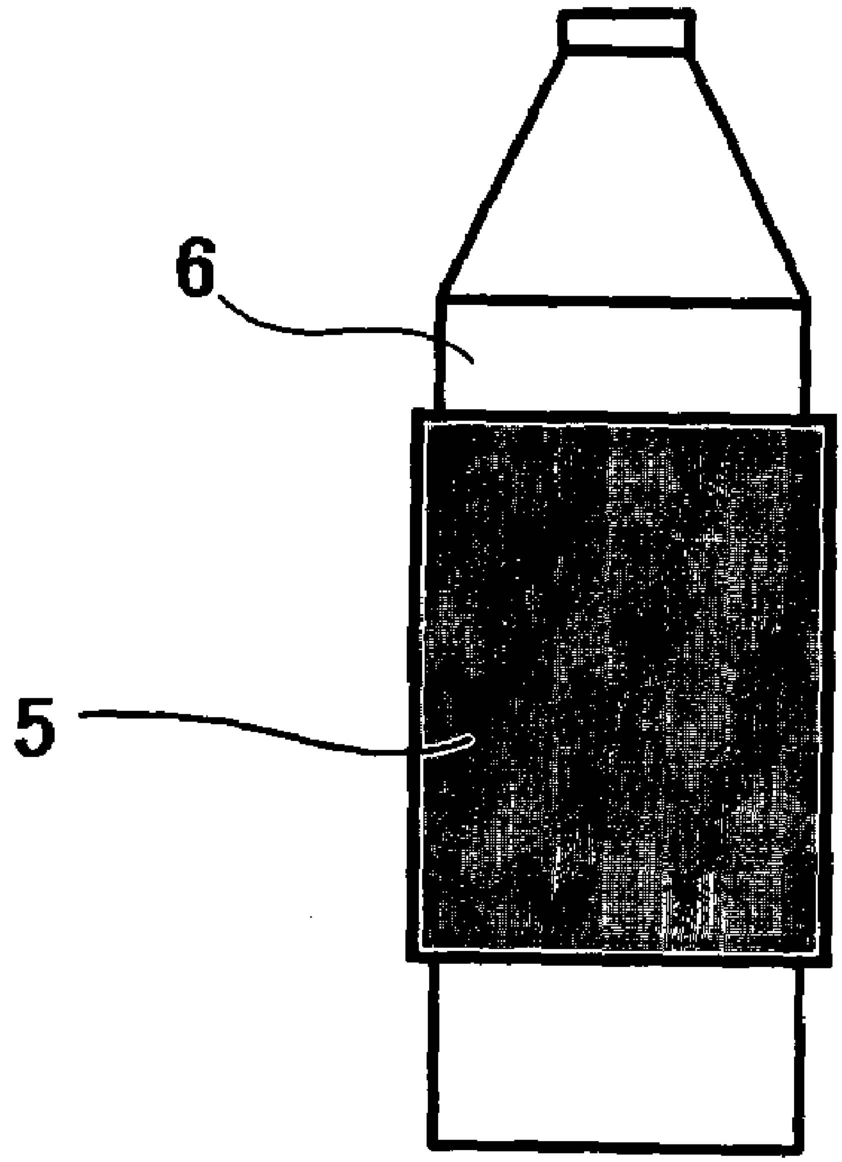
FIG. 12 is a schematic view illustrating a good (container) to which a stretch label is attached.

Thus, the stretch label 5 is attached to the bottle 6 as illustrated in FIG. 12.

By using the stretch label attaching device of the present invention, the stretching ratio of the stretch label can be controlled so as to be not greater than 5%, and therefore a problem such that the stretch label loses its stretchability. In addition, the operation efficiency of this method is five or more times that of conventional manual label attaching operations. Further, the method has an advantage in that stretch labels can be attached with a relatively high positional precision compared to conventional manual label attaching methods.

This label attaching operation is not limited to a manual operation and can be performed mechanically.

EFFECT OF THE PRESENT INVENTION

By using the stretch label attaching device of the present invention, a stretch label can be easily attached to a good such as containers with high precision.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A stretch label attaching device for attaching a stretch label on a good, comprising:

an adapter configured to support the stretch label from an inside of the stretch label and having an opening into which the good is inserted when attaching the stretch label on the good;

an adapter support member configured to support a lower portion of the adapter and having an opening into which the good is inserted when attaching the stretch label on the good; and a single adapter fixing member formed around a circumference of the adapter, configured to fix the lower portion of the adapter together with the adapter support member wherein an outer surface of the adapter support member has a plurality of projected portions and a plurality of recessed portions formed on top of each other with the plurality of projected portions configured to contact an inside surface of the adapter to secure the adapter between the adapter support member and adapter fixing member.

2. The stretch label attaching device according to claim 1, wherein the adapter fixing member and the adapter support member are engaged with each other with the adapter therebetween.

3. The stretch label attaching device according to claim 1, wherein the adapter fixing member and the adapter support member fixedly support the adapter while contacting at least one point of the adapter.

4. The stretch label attaching device according to claim 1, wherein a length of a portion of the adapter extending from the adapter fixing member is shorter than a length of the stretch label.

5. The stretch label attaching device according to claim 1, wherein at least a top portion of the adapter is tapered.

6. The stretch label attaching device according to claim 1, wherein the adapter has a notch extending from a top thereof toward a bottom thereof.

7. The stretch label attaching device according to claim 6, wherein the notch is formed such that an extension of the notch is perpendicular to a tangent line at a point of the bottom of the adapter at which the extension of the notch meets the bottom of the adapter.

8. The stretch label attaching device according to claim 6, wherein an edge portion of the notch is curled inwardly.

9. The stretch label attaching device according to claim 6, wherein the notch extends so as to meet the adapter fixing member when the adapter is fixed by the adapter fixing member and the adapter support member.

10. The stretch label attaching device according to claim 1, wherein the adapter is elastic and has at least one of an extending/contracting property.

11. The stretch label attaching device according to claim 1, wherein the adapter comprises a polyethylene terephthalate film having a thickness of from 10 to 200 μm.

12. The stretch label attaching device according to claim 1, wherein both the adapter and the adapter fixing member have an elasticity, and wherein the elasticity of the adapter fixing member is larger than that of the adapter.

13. The stretch label attaching device according to claim 1, wherein when the good is inserted into the stretch label attaching device through the openings of the adapter support member and the adapter to an extent such that a bottom of the good is level with a bottom of the adapter support member, the stretch label occupies a predetermined attaching position of the good.

14. The stretch label attaching device according to claim 1, wherein an outer surface of the adapter has a slipping property higher than that of an inner surface of the stretch label.

15. The stretch label attaching device according to claim 1, wherein an inner surface of the adapter support member has a slipping property higher than that of an outer surface of a good to which the stretch label is attached.

16. The stretch label attaching device according to claim 1, wherein an inner surface of the adapter support member has a projected portion and a recessed portion.

17. The stretch label attaching device according to claim 1, wherein the adapter support is configured to slide.

18. The stretch label attaching device according to claim 17, wherein the adapter support member comprises a material selected from the group consisting of polyacetals, nylons, and polyethylenes.

19. The stretch label attaching device according to claim 1, further comprising a counter configured to count the stretch label attached.

* * * * *